(12) United States Patent
Pugaczewski (10) Patent No.: US 10,153,946 B2
(45) Date of Patent: Dec. 11, 2018

(54) TOPOLOGY ENGINE STATE TRACKING

(71) Applicant: CenturyLink Intellectual Property LLC, Denver, CO (US)

(72) Inventor: John T. Pugaczewski, Hugo, MN (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 452 days.

(21) Appl. No.: 14/682,360

(22) Filed: Apr. 9, 2015

(65) Prior Publication Data
US 2015/0295774 A1    Oct. 15, 2015

Related U.S. Application Data

(60) Provisional application No. 61/979,799, filed on Apr. 15, 2014.

(51) Int. Cl.
*H04L 12/24* (2006.01)
*H04L 12/26* (2006.01)

(52) U.S. Cl.
CPC .......... *H04L 41/12* (2013.01); *H04L 43/0817* (2013.01)

(58) Field of Classification Search
None
See application file for complete search history.

(56) References Cited

U.S. PATENT DOCUMENTS 6,061,735 A * 5/2000 Rogers .................... H04L 41/00
370/221
6,903,755 B1 * 6/2005 Pugaczewski .......... H04L 41/00
715/735
7,181,141 B1    2/2007 Kapur et al.
(Continued)

FOREIGN PATENT DOCUMENTS

| EP | 3235868 | 2/2017 |
|---|---|---|
| WO | WO-2011-026340 A1 | 3/2011 |
| WO | WO-2015/160810 | 10/2015 |

OTHER PUBLICATIONS

International Application No. PCT/US2015/025755; International Preliminary Report on Patentability dated Oct. 27, 2016; 9 pages.
(Continued)

*Primary Examiner* — Saba Tsegaye
(74) *Attorney, Agent, or Firm* — Adsero IP (57) ABSTRACT

A system for topology state tracking includes a client device requesting network topology information, and a topology engine coupled to one or more network device. The topology engine includes at least one processor, and non-transitory computer readable media having encoded thereon computer software having a set of instructions executable by the at least one processor to perform one or more operations. The set of instructions includes instructions to receive state information associated with at least one network service, generate network topology information based on the state information, determine changes in the network topology for the at least one network service, update the network topology information, provide access to the network topology information by the client device, receive a request for network topology information from the client device, and transmit the network topology information to the client device.

20 Claims, 6 Drawing Sheets

(56) References Cited

U.S. PATENT DOCUMENTS

| | | | |
|---|---|---|---|
| 8,824,274 B1* | 9/2014 | Medved | H04L 41/12 370/217 |
| 2005/0198623 A1 | 9/2005 | Amin et al. | |
| 2010/0115100 A1* | 5/2010 | Tubman | G06F 17/30545 709/227 |
| 2011/0289119 A1 | 11/2011 | Hu et al. | |
| 2011/0302496 A1 | 12/2011 | Pugaczewski et al. | |
| 2012/0275311 A1 | 11/2012 | Ivershen et al. | |
| 2012/0322432 A1* | 12/2012 | Biernat | H04L 12/24 455/418 |
| 2013/0191517 A1 | 7/2013 | Ling et al. | |
| 2013/0304877 A1* | 11/2013 | Um | H04L 41/082 709/220 |
| 2014/0067621 A1* | 3/2014 | Urdang | G06Q 10/20 705/27.1 |
| 2014/0095717 A1 | 4/2014 | Danforth et al. | |

OTHER PUBLICATIONS

International Application No. PCT/US2015/025755; International Search Report and Written Opinion dated Jul. 13, 2015; 12 pages.
European Search Report for EP 15779501.4, dated Nov. 6, 2017; 8 pages.

* cited by examiner

TOPOLOGY ENGINE STATE TRACKING

CROSS-REFERENCES TO RELATED APPLICATIONS

This application claims priority to U.S. Provisional Patent Application Ser. No. 61/979,799 (the "'799 application"), filed on Apr. 15, 2014 by Steven M. Casey, et al., entitled, "Topology Engine State Tracking," the disclosure of which is incorporated herein by reference in its entirety and for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to network topology management, and more particularly to systems and methods for topology state tracking and mapping using data from a topology engine.

BACKGROUND

Topology engines are a key component in the implementation of products and services in a network system. Conventionally topology engines enable and enhance a service provider's ability to perform service fulfillment and assurance in a reliable manner. Topology engines and corresponding client API provide an abstracted interface for client queries of topological information at various layers, for example, in a network management logical layered architecture (LLA), or other types of protocol suite/stack. For example, as will be appreciated by one having skill in the art, a network management LLA may include, without limitation, a network element layer (NEL), element management layer (EML), network management layer (NML), service management layer (SML), and business management layer (BML).

The topology engine usually communicates with multiple devices and systems, such as element management systems (EMS), inventory systems, network management systems, and other sources of topology and/or inventory information. The topology engine accesses these systems and retrieves inventory and topological information. Topological information is essential in order to perform accurate causal analysis and determine the physical location and protocol layer in the event of a hard or soft fault condition. It is also difficult to perform real-time causal analysis once the topology is derived.

Thus, a way to track and analyze changes to a topology is provided below.

BRIEF SUMMARY

The various embodiments provided below include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a system for topology state tracking includes a client device requesting network topology information, and a topology engine coupled to one or more network device and in communication with the client device. The topology engine may include at least one processor, and non-transitory computer readable media having encoded thereon computer software comprising a set of instructions executable by the at least one processor to perform one or more operations. The set of instructions includes instructions to receive, from each of the one or more network device, state information associated with at least one network service. Based on the state information, network topology information may be generated for the at least one network service, wherein the network topology information is indicative of a network topology in real-time, based on the state information. The instructions may further include instructions to determine, based on the state information, changes in the network topology for the at least one network service. In response to these changes, the network topology information may be updated. A state tracking application programming interface may be provided allowing access to the network topology information by the client device. The instructions may include instructions to receive, via the state tracking application programming interface, a request for network topology information from the client device. The network topology information may be transmitted to the client device via the state tracking application programming interface client device. The client device may generate a topology map from the network topology information, wherein the topology map visually represents a network topology and changes to the network topology in real-time.

In accordance with one set of embodiments, the set of instructions may further include instructions to synchronize network topology information with the client device, wherein updates to the network topology information are automatically transmitted. In some embodiments, the changes to the network topology may be indicated visually on the topology map of the client device. In other embodiments, the request for network topology information may specify a layer of the one or more layers, and wherein the topology engine transmits network topology information corresponding to the layer of the one or more layers indicated in the request.

In further embodiments, the network topology information may correspond to state information for one or more layers of the at least one network service. The topology map may depict a network topology at the one or more layers of the at least one network service. The client device may generate a topology map for a single layer of the one or more layers. The request for network topology information may specify a layer of the one or more layers, wherein the topology engine may transmit network topology information corresponding to the layer of the one or more layers indicated in the request; and the topology map may depict a network topology at the layer indicated for the at least one network service. In further embodiments, the request for network topology information may specify a network service of the at least one network service, wherein the topology engine may transmit network topology information corresponding to the specified network service of the at least one network service as indicated in the request.

In another aspect, a topology engine for topology state tracking is provided. The topology engine may include at least one processor, and non-transitory computer readable media having encoded thereon computer software comprising a set of instructions executable by the at least one processor to perform one or more operations. The set of instructions may include instructions to receive, from each of the one or more network device, state information associated with at least one network service; instructions to generate, based on the state information, network topology information for the at least one network service, wherein the network topology information is indicative of a network topology in real-time, based on the state information; instructions to determine, based on the state information, changes in the network topology for the at least one network service; instructions to update, in response to the changes in the network topology, the network topology information; instructions to provide, via a state tracking application programming interface, access to the network topology information by a client device; instructions to receive, via the state tracking application programming interface, a request for network topology information from the client device; and instructions to transmit, via the state tracking application programming interface, the network topology information to the client device.

In some embodiments, the set of instructions may further include instructions to poll each of the one or more network devices for their respective state information. In further embodiments, the set of instructions may include instructions to synchronize network topology information with the client device, wherein updates to the network topology information are automatically transmitted. The network topology information may correspond to state information for one or more layers of the at least one network service. Furthermore, the request for network topology information may specify a layer of the one or more layers, wherein the topology engine transmits network topology information corresponding to the layer of the one or more layers indicated in the request. In some further embodiments, the request for network topology information may also specify a network service of the at least one network service, wherein the topology engine transmits network topology information corresponding to the specified network service of the at least one network service as indicated in the request.

In yet another aspect, a method for topology engine state tracking is provided. The method includes providing, via a topology engine, access to network topology information by a client device. State information associated with one or more network devices and at least one network service may be received via the topology engine. Based on the state information, the topology engine may generate network topology information for the at least one network service. The topology engine may then receive a request for the network topology information from the client device. The method further includes transmitting, via the topology engine, the network topology information to the client device, and determining, via the topology engine, changes in the network topology for the at least one network service based on the state information. The network topology information may be updated, via the topology engine, with the changes detected in the network topology.

In accordance with one set of embodiments, the method may further include synchronizing, via the topology engine, the client device with updates to the network topology information, and transmitting, via the topology engine, updates to the network topology information automatically to the client device. In further embodiments, the network topology information may correspond to state information for one or more layers of the at least one network service. The request for network topology information may further specify a layer of the one or more layers, and wherein the topology engine transmits network topology information corresponding to the layer of the one or more layers indicated in the request. In some embodiments, the request for network topology information may also specify a network service of the at least one network service, wherein the topology engine may transmit network topology information corresponding to the specified network service of the at least one network service as indicated in the request.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The accompanying descriptions of FIGS. 1-6 are provided for purposes of illustration and should not be considered to limit the scope of the different embodiments. FIGS. 1-6 may refer to examples of different embodiments corresponding various stages and components of the captive portal service offering system, which can be considered alternatives or which can be used in conjunction with one another in the various embodiments.

Figure 1:
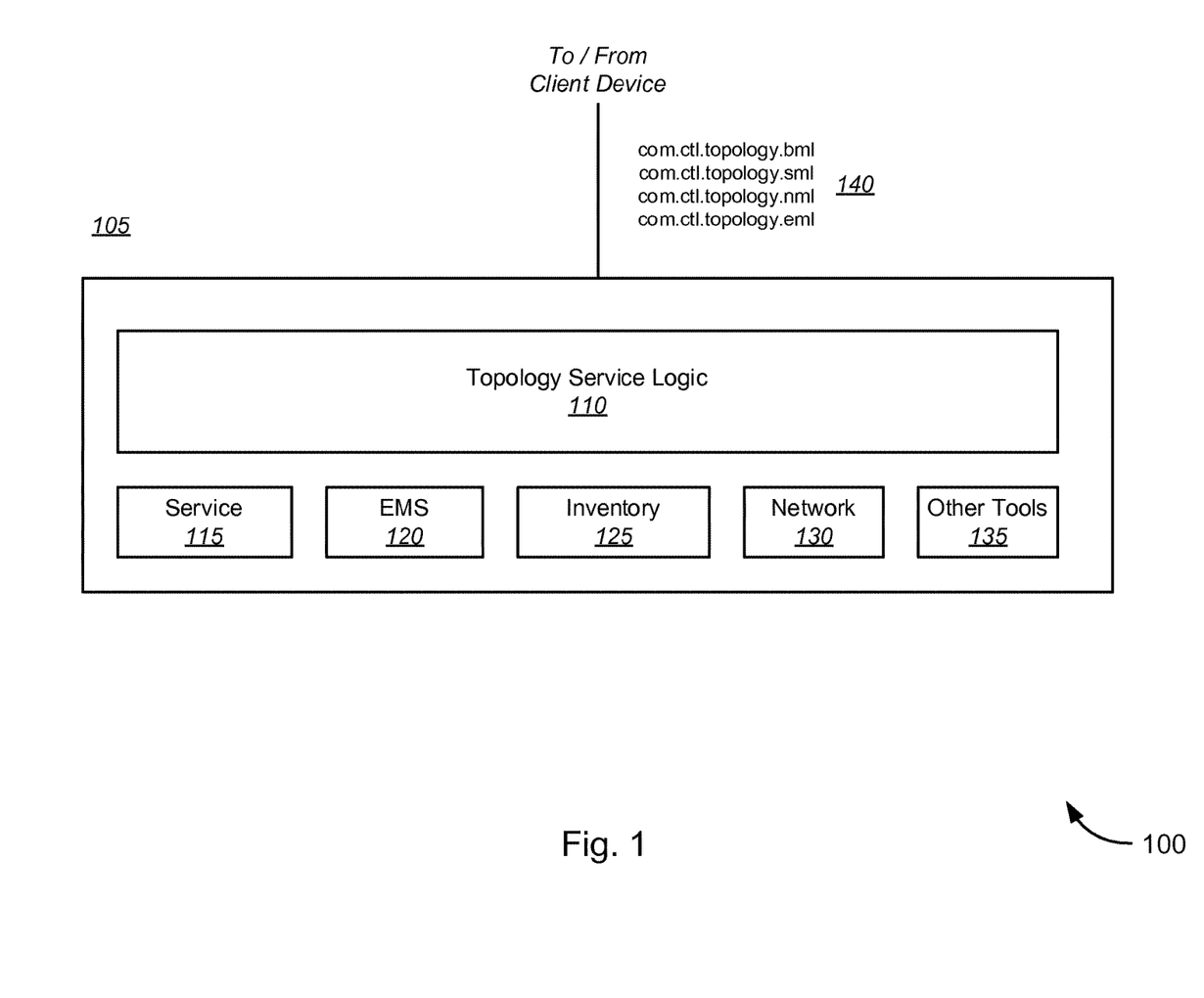
FIG. 1 is a schematic block diagram of a topology engine, in accordance with various embodiments.

FIG. 1 is a schematic block diagram 100 of a topology engine 105, in accordance with various embodiments. According to one set of embodiments, topology engine 105 may be a computer system, server, or other network element configured to execute topology service logic 110. For example, in various embodiments, the topology engine may be a discrete device dedicated to running the topology service logic 110. In other embodiments, the topology engine may be implemented in an existing computer system or device, such as a network interface device (NID), edge device, or other like network devices.

In various embodiments, the topology engine 105 communicates with and receives state information from one or more network devices to which it is connected. To receive state information, topology service logic 110 may communicate with the one or more network devices via a plurality of management tools.

According to one set of embodiments, these management tools may include, without limitation, a service management system 115, an element management system (EMS) 120, inventory management system 125, network management systems 130, and other tools 135 such as application response measurement functionality. Like topology service logic 110, each of the management tools Each of the management tools may respectively be associated with a plurality of network devices on one or more layers of a network management LLA, and, as the case may be, associated with a specific layer of a technology stack. In some embodiments, network devices may be associated multiple layers of a network management LLA.

For example, according to one set of embodiments, service management system 115 may be used to access and receive state information from one or more network devices, which topology service logic 110 uses to generate BML, and/or SML network topology information. In one set of embodiments, BML network topology information may relate to the performance and operation of the business itself. For example, BML network topology information may indicate, without limitation, statistics and performance metrics for a service or combination of services as offered in various geographical markets, an inventory of offered services by respective region, performance of each of the services in each respective region, and other like information. SML network topology information may relate to, without limitation, the provisioning of and fulfillment of services, such as service quality and performance metrics as reported by the relevant network devices and hardware, and an inventory of the relevant network devices and hardware.

The EMS 120 may be utilized to access state information from one or more network devices, which topology service logic 110 uses to generate EML network topology information of associated network elements. EML network topology information may relate to, without limitation, the attributes, characteristics, and an inventory of the individual network elements themselves.

The inventory system 125, and/or network management tool 130, may be utilized to retrieve state information from one or more network devices, which topology service logic 110 uses to generate NML network topology information indicative of characteristics, performance metrics, network inventory, and other attributes of one or more networks.

Other tools 135, such as, without limitation, an application response measurement functionality, may be utilized to retrieve state information from which other network topology information may be generated by topology service logic 110. For example, an application response measurement functionality may indicate characteristics and performance metrics for a specific application, and an inventory of one or more network devices associated with the specific application.

In various embodiments, the topology service logic 110 may utilize state information to generate network topology information at the various layers using static and dynamic derivation, and stitching functionality. Thus, network topology information may include, without limitation, state information utilized by the topology service logic 110 to stitch together a graph for the appropriate layer. The graph may depict, without limitation, a path, explicit route objects (ERO), and one or more respective services.

Thus, a client device may transmit a query 140 to the topology engine 105, via topology engine API, to request network topology information at the various layers. For example, a request to BML may request business and/or customer topology information, a request to SML may request service topology, and a request to EML may request network topology information on a network element level. In this manner, a client device is able to request and receive instantaneous network topology information.

Figure 2:
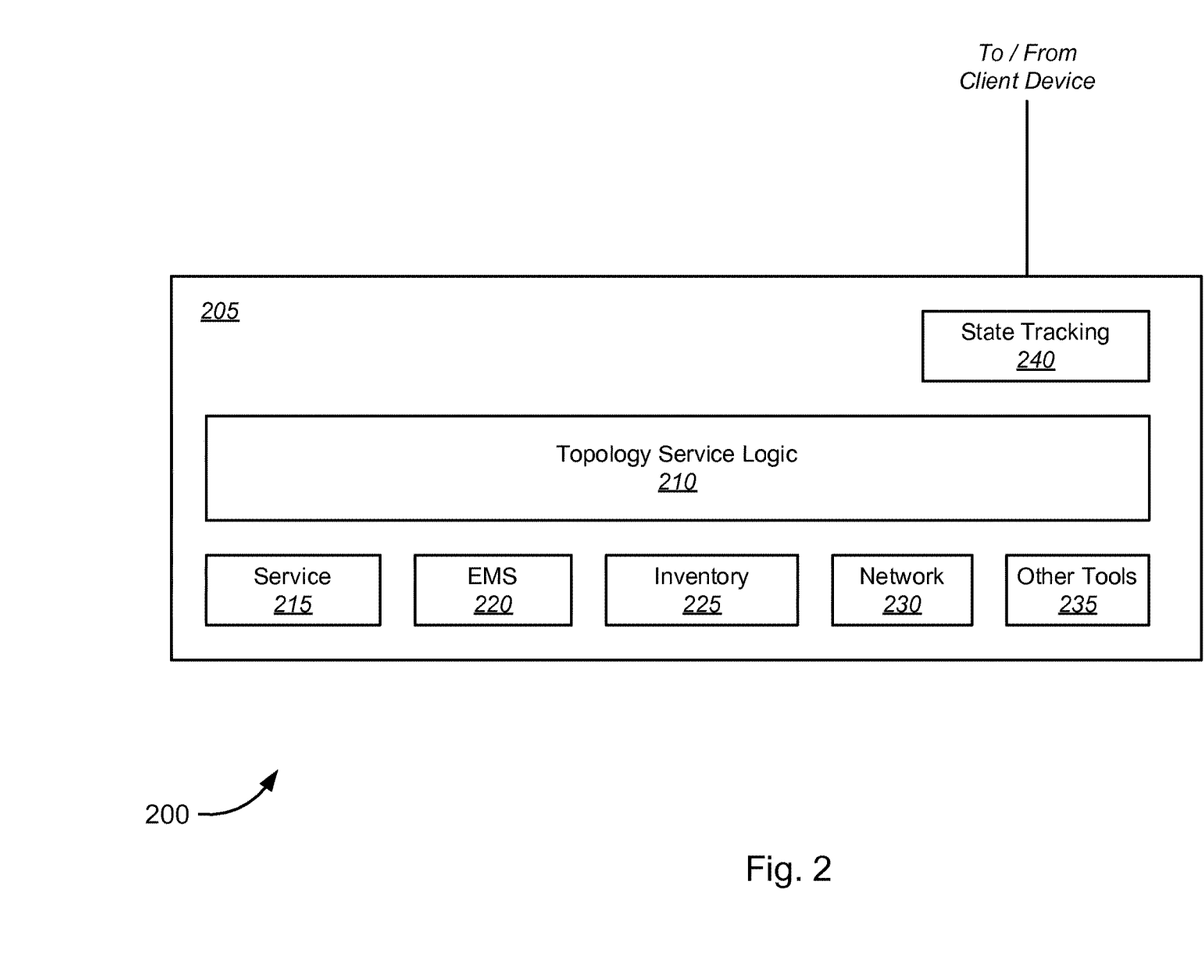
FIG. 2 is a schematic block diagram of a topology engine having state tracking functionality, in accordance with various embodiments.

In the event of a fault condition, utilizing a system where only instantaneous network topology information is requested periodically or manually, it is very difficult, if not impossible, to perform accurate causal analysis and determine the physical location and protocol layer of the fault condition. Thus, FIG. 2 provides schematic block diagram 200 of a topology engine with state tracking functionality 205, in accordance with various embodiments.

According to one set of embodiments, similar to the topology engine 105 described in FIG. 1, the topology engine 205 includes topology service logic 210, which may be utilized to retrieve state information from one or more network devices, via one or more management tools.

According to various embodiments, these tools may include, without limitation, a service management system 215, an EMS 220, an inventory management system 225, network management systems 230, and other tools 235 such as application response measurement functionality. Each of the management tools may respectively be associated with a plurality of network devices on one or more layers. The topology engine 205 may further include state tracking functionality 240.

As described above with respect to FIG. 1, the service management system 215 may similarly be used to retrieve state information to generate BML and/or SML network topology information; EMS 220 may similarly be used to retrieve state information to generate EML network topology information; inventory management system 225 and/or network management tool 230 may similarly be used to retrieve state information to generate NML network topology information; and other tools 235 may be used to retrieve state information to generate network topology information on the various layers.

Unlike the topology engine 105 described FIG. 1, however, the topology engine 205 communicates with the client device via a state tracking API to access state tracking functionality 240. According to one set of embodiments, state tracking functionality 240 allows the client device to request network topology information with the additional request to remain synchronized with the state of the network topology information. According to various embodiments, state tracking functionality may not be invoked with every network topology information request (i.e. topology engine API call). Instead, state tracking functionality 240 may be invoked separately when the network topology information request is made by requiring continuous state monitoring, via a state tracking API. In other embodiments, state tracking functionality 240 may be invoked in a combined manner with a network topology information request. For example, in some embodiments, state tracking functionality 240 may be invoked automatically with every request for network topology information. In further embodiments, the state tracking API may be a message-based API that leverages a message-based interface for requesting and receiving state changes to the network topology, for at least one layer and at least one network service. In various embodiments, when state tracking functionality 240 is invoked, the topology service logic 210 may need to remain synchronized with the various management tools and topological components to provide updated, real-time, network topology information. Topological components may include, without limitation, various tools, devices, and hardware operable to retrieve and collect state information from one or more network devices. Topological components may be operable to retrieve state information, and other topological information, such as, without limitation, resource inventories. Topological components may be associated with one or more layers and/or one or more services.

In accordance with various sets of embodiments, the topology engine 205 may receive a request for network topology information via a state tracking API. The request may indicate that continuous state monitoring is required to invoke state tracking functionality 240. Alternatively, the request may automatically invoke state tracking functionality 240 by making the request for network topology information via a state tracking API, as opposed to a separate topology engine API. In other embodiments, a request for network topology information alone may automatically trigger state tracking functionality 240.

The request for network topology information may further indicate at least one network service and/or at least one layer. For example, network services may include, without limitation, broadband internet services, television service, voice/telephone service, mobile broadband service, various application services, streaming content services, etc. Thus, in various embodiments, a request for network topology information may indicate a specific layer, for example, EML network topology information indicating a topology of the various network elements associated with a particular network service, for example, streaming content services. In other embodiments, a request for network topology information may request network topology information for a single layer, for example, EML network topology information, for all available network services. In an alternative set of embodiments, the request for network topology information may request network topology information for all layers applicable to a particular network service, for example, streaming content services, or a subset of network services. Thus, in further embodiments, different permutations of layers and network services may be indicated by the request, as desired by a user of the client device.

In response to the request for network topology information, the topology engine 205 may retrieve state information from one or more network devices via the appropriate management tools. Continuing with the previous examples, if the request for network topology information indicates a request for EML network topology information for streaming content services, the topology service logic 210 may retrieve state information from EMS 220 for each of one or more network devices associated with streaming content services. In other embodiments, the request for network topology information may indicate a single layer, such as EML, for all available network services, the topology service logic 210 may retrieve state information, via EMS 220, from all connected network devices. In other embodiments, where the request for network topology information indicates a single network service, such as content streaming services, or a set of network services, the topology service logic 210 may retrieve state information via the available management tools, such as the service management system 215, EMS 220, inventory system 225, other network management tools 230, and other management tools 235, to retrieve state information from one or more network devices associated with the content streaming service, or the set of one or more specified network services respectively.

Based on the received state information, the topology service logic 210 may then stitch together the requested network topology information. For example, according to various embodiments, network topology information may be a graph stitched together from the state information, depicting, without limitation, paths, explicit route objects (ERO), network elements, and one or more respective services, on one or more layers. For example, if the request for network topology information indicates a request for EML network topology information for a content streaming service, the topology service logic 210 may stitch together a graph depicting paths and EROs at the EML (i.e. network elements) associated with the content streaming service. If the request for network topology information indicates a request for EML network topology information for all available network services, the topology service logic 210 may stitch together a graph depicting paths and EROs at the EML, for each respective network service of the available network services. If the request for network topology information requests network topology information for any or all network services, but for all applicable layers, the topology service logic 210 may stitch together a graph depicting paths and EROs at each of the layers (i.e. BML, SML, NML, EML), for the indicated network service, such as content streaming services, a set of network services, or all available network services.

According to various embodiments, the topology engine 205 may then transmit the requested network topology information, via the state-tracking API, to the requesting client device. In one set of embodiments, the topology engine 205 may push the network topology information as it is generated by the topology service logic 210 from the state information. In another set of embodiments, the topology engine 205 may allow the client device to access the network topology information as it is generated by the topology service logic 210 such that the client device can pull the network topology information as it becomes available.

In various embodiments, the request for network topology information may also indicate a request to invoke state tracking functionality 240 by requesting to remain synchronized with the state of the network topology information. As described above, the request to invoke state tracking functionality 240 may be made as a separate request sent via a state-tracking API, or may be combined with the request for network topology information itself. In response to receiving the request to remain synchronized with the state of the network topology information, the topology service logic 210 may further be configured to remain synchronized with the various topological components and management tools. In doing so, the topology service logic 210 may determine whether changes have occurred to a respective network topology associated with the requested network topology information, and as determined based on the relevant state information.

For example, if the request for network topology indicates a request for EML network topology information for a content streaming service, the topology service logic 210 may monitor state information retrieved via the EMS from one or more network devices associated with the content streaming service to determine whether a change has occurred to the EML topology. If the request for network topology indicates a request for EML network topology information for all available network services, the topology service logic 210 may monitor state information retrieved via the EMS for each of one or more network devices associated with each of the available network services to determine whether a change has occurred to the EML topology for any of the available network services. If the request for network topology indicates a request for network topology information for any or all available network services, but for all applicable layers of network topology information, the topology service logic 210 may monitor state information retrieved via each of the management tools and components for each of the one or more network devices associated with the network services indicated in the request to determine whether a change has occurred to the topology at any of the layers.

If the topology service logic 210 detects a change to the network topology, the topology service logic 210 updates the network topology information with the change correspondingly, as indicated by the state information. The updated network topology information is then transmitted to the client device by the topology engine 205. In this manner, the client device is able to generate a topology map graphically depicting a network topology, and changes to the network topology, in real-time.

Figure 3:
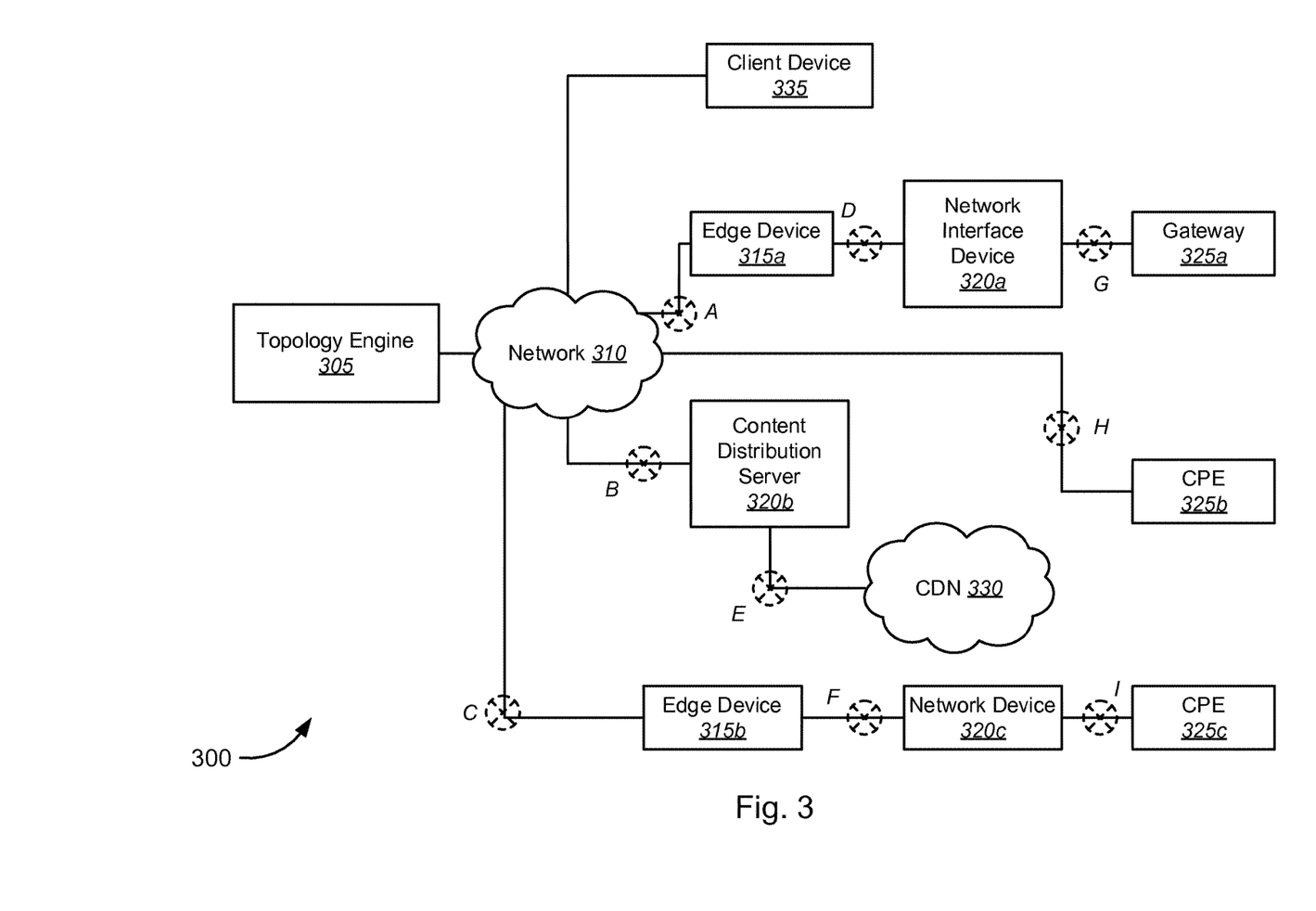
FIG. 3 is a block diagram of a system for topology engine state tracking, in accordance with various embodiments.

Shifting the focus from the topology engine 205, in FIG. 2, to the system 300 as a whole, FIG. 3 illustrates block diagram of a system 300 for topology engine state tracking, in accordance with various embodiments. The system 300 includes a topology engine 305, having state tracking functionality, coupled to various network devices, and client device 335, via network 310.

As illustrated, according to one set of embodiments, topology engine 305 may be coupled, via network 310, to edge device 315a, which in turn is coupled to a network interface device (NID) 320a. NID 320a may then be coupled to a gateway device 325a. Edge device 315a may be any suitable device acting as an interface device at the edge of a service provider network, and may include, without limitation, a broadband remote access server (BRAS), broadband network gateway (BNG), edge routers, or other edge device. NID 320a may include devices such as, without limitation, an optical network terminal (ONT), or other like NID devices. Gateway device 325a may include, without limitation, devices such as a set-top box, modem, voice over internet protocol (VoIP) adapter, router, switch, or other like device.

The topology engine may further be in communication with a content distribution server 320b, which is in turn coupled to a third-party content distribution network (CDN) 330. Customer premises equipment 325b may then be coupled to the content distribution server 320b via the service provider network 310. The CPE 325b may include, but is not limited to, a personal computer, set-top box, other gateway device, smartphone, tablet, or other mobile communication device. According to one set of embodiments, the CPE 325b may belong to a subscriber receiving a content streaming service. Thus, CPE 325b may receive streaming media content, from the content distribution server 320b, and over network 310.

The topology may further be connected to an edge device 315b, which is in turn connected to a network device 320c. Network device 320c may include without limitation, various types of edge devices, as described with respect to edge device 315a, various NIDs, as described with respect to NID 320a, gateway devices, as described with respect to gateway device 325, or other types of interface devices, such as digital subscriber line access multiplexers (DSLAM), cable modem termination systems (CMTS), and optical line terminals (OLT). Network device 320c may in turn be coupled to CPE 325c, which may include, without limitation, the various devices described above with respect to CPE 325b.

According to various embodiments, hard or soft faults may occur at various points along the links between the various network devices, including edge devices 315a, 315b, NID 320a, content distribution server 320b, network device 320c, gateway device 325a, CPE 325b, 325c, and connection to the content distribution network 330. Furthermore, hard or soft faults may occur at the various network devices themselves. For example, in various embodiments, a fault may occur at point A between edge device 315a and network 310a. This may indicate a fault exists on the link itself, with a component on the network 310 itself, or the edge device 315a itself. Similarly, a fault detected at point B may indicate a fault with the connection from the content distribution server 320b to network 310, the content distribution server 320b itself, or a component on the network 310. Each of the remaining points C-I indicate faults detected at corresponding links and/or network devices.

According to one set of embodiments, the topology engine 305 may receive a request for network topology information, over network 310, from client device 335. As described above with respect to FIG. 1, in various embodiments, topology engine 305 may be a computer system, server, or other network element configured to execute topology service logic. The topology engine 305 may further provide access to network topology information in real-time via a state tracking API. In one set of embodiments, the request may indicate that continuous state monitoring is required to invoke state tracking functionality. Alternatively, the request may automatically invoke state tracking functionality by making the request for network topology information via the state tracking API, as opposed to a separate, conventional topology API call. In other embodiments, the request for network topology information alone may automatically trigger state tracking functionality.

In some embodiments, the request for network topology information may further indicate at least one network service being provided by a service provider. The request may specify any or all of the available network services by, for example, specifying an individual network service (i.e. content streaming service), a set of services (e.g. content streaming services, television services, broadband internet service, and VoIP service), or all available services provided by the service provider. Similarly, the request may specify at least one layer for which to retrieve the network topology information. As with the network services, the request may specify any or all of the layers for which network topology information is requested.

In response to receiving the request for network topology information, the topology engine may then retrieve state information from the network devices and generate the requested network topology information from the state information. In one set of embodiments, state information may be selectively retrieved from the appropriate network devices as determined from the request for network topology information. In other embodiments, state information may be gathered in bulk, and network topology information may then be generated as indicated in the request. As described above, the topology engine may have various management tools with which state information is gathered from the various network devices.

Continuing with the previous example used with respect to FIGS. 1 & 2, if the request for network topology information indicates a request for EML network topology information for streaming content services, the topology engine 305 may retrieve state information from an EMS for each of the one or more network devices associated with the streaming content services. In this case, the topology engine 305 may retrieve state information from CPE 325b, content distribution server 320b, and from the CDN 330. In various embodiments, the state information may be indicative of the state of the individual elements themselves, thus representing information on the EML.

If the request for network topology information indicates that network topology information is requested for all available network services on a single layer, such as EML, the topology engine 305 may retrieve state information from an EMS for each of the one or more network devices associated with every available network service. For example, topology engine 305 may retrieve state information from CPE 325b, content distribution server 320b, and CDN 330 for content streaming services; from edge device 315a, NID 320a, gateway device 325a, CPE 325b, edge device 315b, network device 320c, and CPE 325c for broadband internet services; from edge device 315b, network device 320c, and CPE 325c for VoIP service; and from edge device 315a, network interface device 320a, and gateway 325a for television service. Thus, in this example, the gateway device 325a may be provisioned with internet and television service, CPE 325b provisioned for content streaming and internet services, and CPE 325c may be provisioned for telephone (VoIP) and internet services. It is to be understood that the foregoing examples are provided by way of example only and are not to be interpreted as limiting the system in any way. It will be appreciated by those having skill in the art that each of the network devices described above may be interchanged or otherwise arranged to be provisioned with any permutation of network services that may be available.

If the request for network topology information requests network topology information for one or more network services on one or more layers, the topology engine 305 may then retrieve state information from each of the one or more network devices for each of the one or more indicated layers, via various management tools corresponding to the one or more layers. Thus, the topology engine 305 may utilize an EMS to receive EML state information, network management tools to receive NML state information, and so on. In various embodiments, a network device may provide state information on more than one layer. In other embodiments, a network device may only be associated with one layer.

Based on the received state information, the topology engine 305 may then stitch together the state information to generate network topology information. In some embodiments, the network topology information may be a graph, indicating paths, EROs, and one or more network services. Separate graphs may be produced for a single service, single layer, or single service and single layer. Alternatively, graphs may include a combination of services and layers. In various embodiments, the graphs may be created according to a request from the client device 335.

Thus, using the example of generating EML network topology information for content streaming service, if no faults are detected, the network topology information may indicate a graph depicting paths from CPE 325b to a network 310, network 310 to the content distribution server 320b, and from content distribution server 320b to CDN 330. The graph may also indicate that the graph pertains to a network topology for a content streaming service on the EML. If a fault is detected at the CPE 325b, then a graph may indicate a fault on the path between CPE 325b and network 310 at point H, or a fault at CPE 325b itself. Similarly, a fault condition may be detected at the content distribution server 320b. The state information from content distribution server may indicate whether the fault is related to communications between the network 310 and content distribution server 320b, or between the CDN 330 and content distribution server 320b. Alternatively, the state information may indicate that the fault lies with the content distribution server itself. Thus, the network topology information may indicate the fault as being on the paths at point B, point E, the content distribution server 320b itself, or a combination of the content distribution server 320b and points B and E along the respective paths. Network topology information may be generated in a similar manner for multiple network services on multiple layers. In some embodiments, network services may, without limitation, be distinguished by symbols, colors, text, or other like indicator. Similarly, the layers may also be differentiated, without limitation, based on symbols, colors, text, or other like indicator. Once the network topology information is generated, the topology engine may transmit the requested network topology information to the client device 335.

According to one set of embodiments, the request for network topology information may further invoke state tracking functionality. Thus, in various embodiments, the topology engine 305 may further continuously monitor the management tools and network devices for changes in state information. If a change is detected in the state information, the network topology engine 305 may update the network topology information, and subsequently transmit the update network topology information to the client device 335. This process may occur essentially in real-time, thus keeping the client device and topology engine synchronized with the latest network topology information. With the network topology information, the client device 335 may be able to generate a topology map, visually representing the network topology and, similarly changes, faults, performance information, and other information may presented in real-time on the topology map, described in further detail below with reference to FIG. 4.

Figure 4:
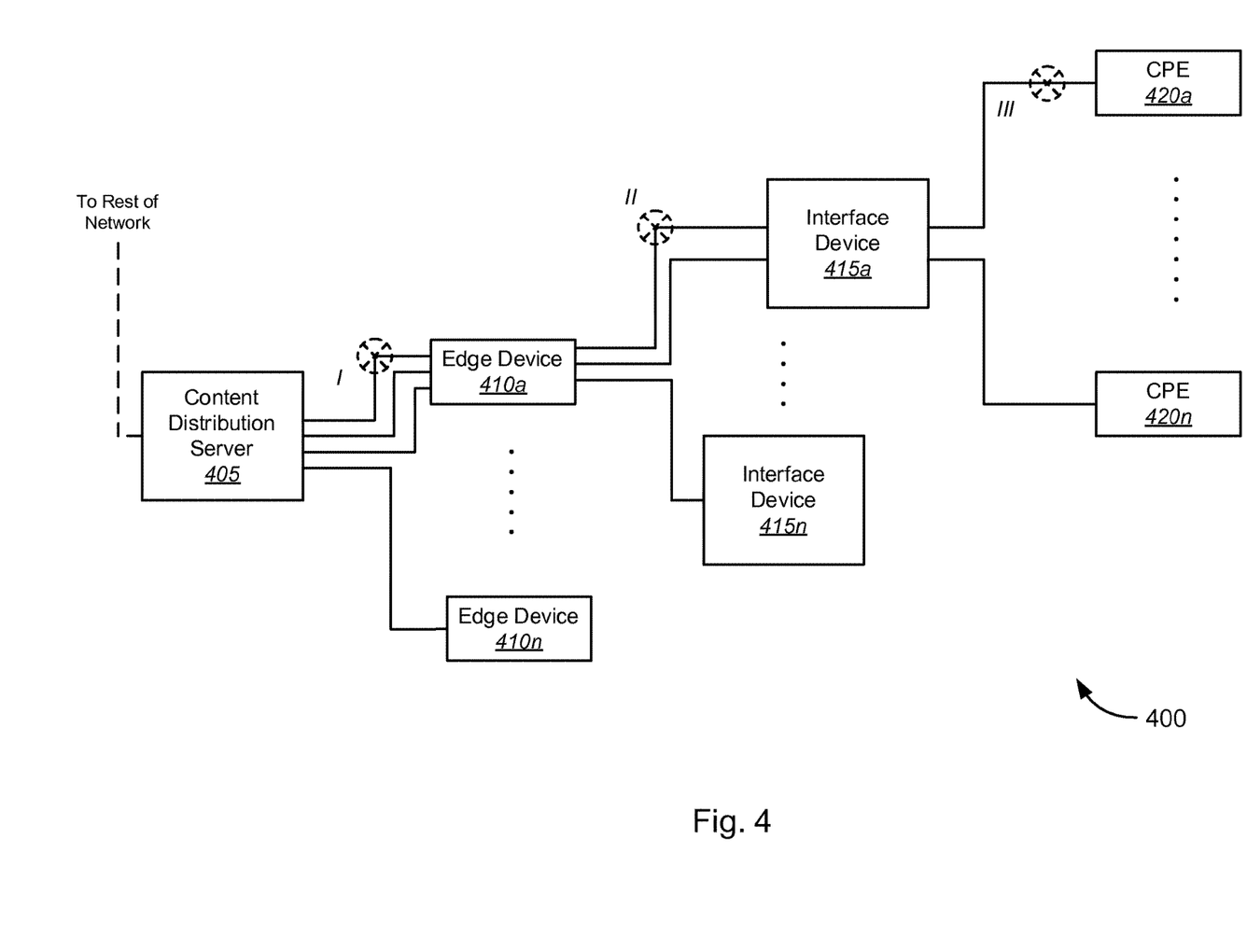
FIG. 4 is a block diagram depiction of a topology map visualization, in accordance with various embodiments.

FIG. 4 is an example of a topology map visualization 400, in accordance with various embodiments. The topology map visualization 400 includes a content distribution server 405 in communication with a plurality of edge devices 410a-410n (410 collectively), each of the edge devices 410 being coupled to a plurality of interface devices 415a-415n (415 collectively), and each of the plurality of interface devices 415 being coupled to a plurality of CPE 420a-420n (420 collectively).

According to various embodiments, the topology map 400 may be generated based on network topology information received from a topology engine. For example, in one set of embodiments, the network topology information may be a graph depicting paths between network elements, EROs, and also indicative of at least one network service. Thus, the client device may generate a topology map based on these graphs. In some embodiments, the topology map 400 may provide multiple paths between network elements, each of the paths representing a different network service, a different layer, or both. Furthermore, as described above with respect to FIG. 3, symbols, colors, shapes, text, or other like indicators may also be utilized to distinguish between network services, layers, or combinations of both.

In various embodiments depicted by topology map 400, three paths are provided between edge device 410a and content distribution server 405, two paths between interface device 415a and edge device 410a, and one path to CPE 420a. According to one set of embodiments, a customer may subscribe to both television service and broadband internet service. CPE 420a may correspond to a set-top box and another piece of CPE 420n may correspond to a modem. Interface device 415a may include various pieces of network equipment in communication with the CPE 420a, 420n, such as, without limitation, various NIDs, gateway devices, or other types of interface devices, such as a DSLAM, CMTS, or OLT. The interface device 415a may then be in communication with an edge device 410a, which may include, without limitation, a BRAS, BNG, Edge Router, or other device. Each of the paths between interface device 415a and edge device 410a may correspond to television service and broadband internet service respectively. The edge device 410a may then be in communication with a content distribution server 405. The three paths leading from content distribution server to edge device 410a may correspond to television and broadband internet service provided to interface device 415a, and another network service provided to a separate interface device 415n.

Thus, in response to a request for network topology information, a topology engine may retrieve state information from one or more network devices, including CPE 420a, interface device 415a, edge device 410a, and content distribution server 405. Network topology information may be generated, from the state information, at all layers for television service, indicating the paths from CPE 420a to interface device 415a, and from interface device 415a to edge device 410a, and from edge device 410a to content distribution server 405. The topology engine may further be synchronized with each of the network devices to continuously monitor the CPE 420a, interface device 415a, edge device 410a, and content distribution server 405 for changes in state information pertaining to television service. Thus, if a fault is detected along any of the paths between the network devices, or at the network devices themselves, including CPE 420a, interface device 415a, edge device 410a, or content distribution server 405, the network topology information may be updated by the topology engine to reflect those changes.

The topology engine may then transmit the updated network topology information to a client device, substantially in real-time, as the changes occur. Thus, topology map 400 may reflect the changes in the updated network topology information. For example, if the updated network topology information indicates a fault is detected along any of the paths between the network devices, the fault may be displayed at point I, point II, or point III, as indicated in the updated network topology information. Similarly, if a fault is detected with the network devices themselves, the fault may be displayed at CPE 420a, interface device 415a, edge device 410a, or content distribution server 405 as indicated in the updated network topology information. If the fault at the network device is service specific, the fault may be indicated such that it is apparent that the fault lies only with the television service, and not broadband service. Thus, according to various embodiments, the topology map 400 may reflect the state of the network topology in real-time utilizing a state tracking functionality of a topology engine.

Figure 5:
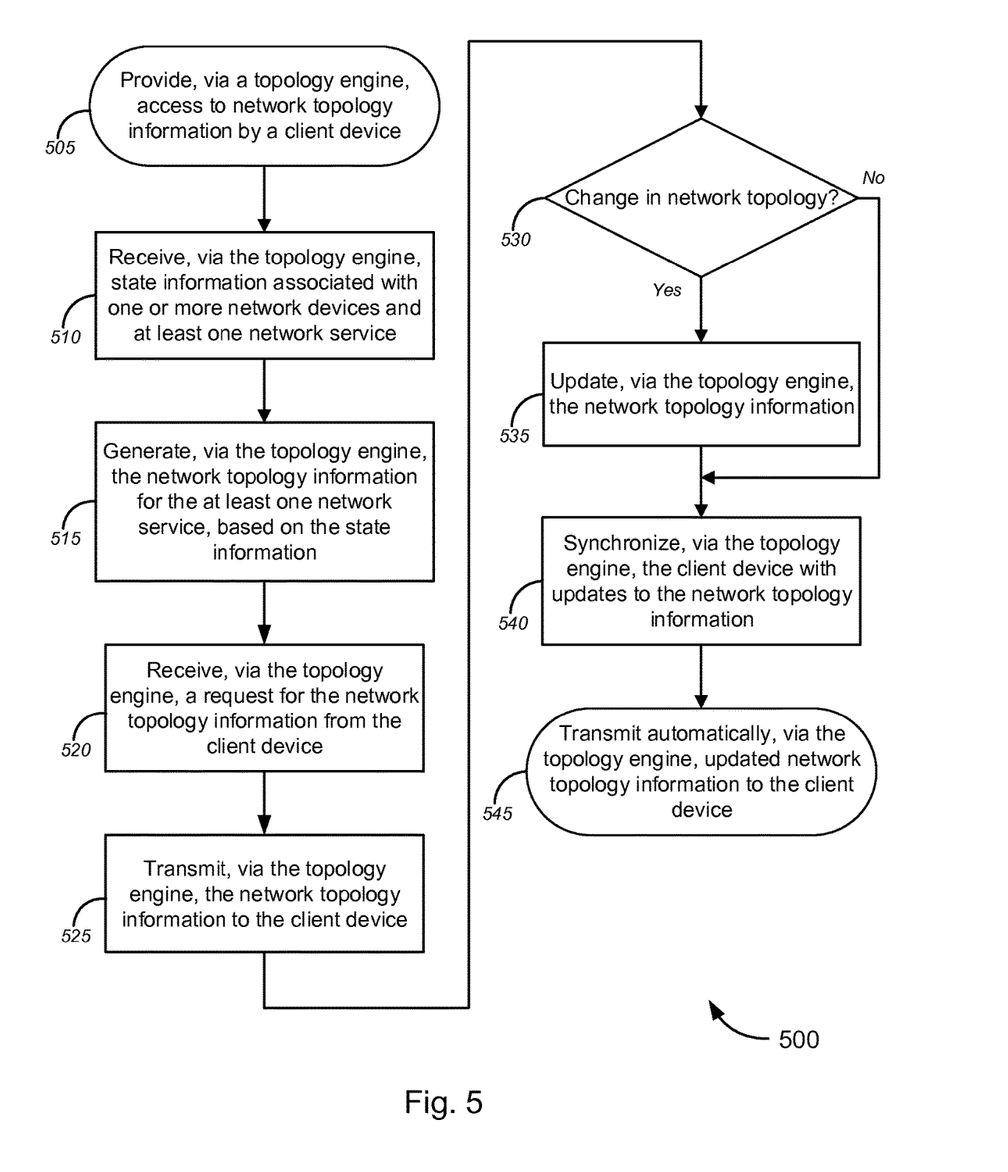
FIG. 5 is a flow diagram of a method for providing topology engine state tracking, in accordance with various embodiments.

FIG. 5 illustrates a flow diagram of a method 500 for providing topology engine state tracking, in accordance with various embodiments. The method begins, at block 505, by providing access, via a topology engine, to network topology information by a client device. In various embodiments, the topology engine may make available an API to the client device for requesting, retrieving, receiving, and/or transmitting network topology information. According to one set of embodiments, a topology engine API may be provided to allow a client device to make requests for network topology information in an instantaneous manner, where the network topology information only reflects the state of the network topology at the time of the request. A separate state-tracking API may be provided that allows the client device to request state-tracking functionality to remain synchronized with the state of the network topology, substantially in real-time, on a continuous basis. In further embodiments, the state tracking API may be a message-based API that leverages a message-based interface for requesting and receiving state changes to the network topology, for at least one layer and at least one network service. In various embodiments, when state tracking functionality is invoked, the topology service logic may need to remain synchronized with the various management tools and topological components to provide updated, real-time, network topology information. In other embodiments, state tracking functionality may be invoked, in a combined manner, with a network topology information request. For example, in some embodiments, state tracking functionality may be invoked automatically with every call to the topology engine API requesting network topology information. Alternatively, a combined API may be made available for invoking both requests for network topology information and state tracking functionality, where requests for network topology information and to invoke state tracking functionality may be made alone, or in combination with one another.

At block 510, state information is received, via the topology engine, from one or more network devices regarding at least one network service. The topology engine may include one or more management tools for accessing state information from one or more network devices. As described above, with respect to FIGS. 1 & 2, management tools may include, without limitation, a service management system, an EMS, inventory system, and other network management tools. State information may indicate a state of the devices and/or services, as well as performance information, and other attributes regarding the one or more network devices.

At block 515, network topology information for the at least one network service may be generated by the topology engine, based on state information received from the one or more network devices. According to various embodiments, the topology engine may stitch together network topology information from the received state information. For example, according to various embodiments, network topology information may be a graph stitched together from the state information, depicting, without limitation, paths, EROs, network elements, and one or more respective services, on one or more layers. Network topology information may be generated for one or more network services and on one or more layers.

At block 520, a request for the network topology information is received, via the topology engine, from the client device. The request may be an API call, as described with respect to block 505, by the client device for network topology information. In various embodiments, the request may also further invoke state tracking functionality. According to one set of embodiments, state tracking functionality may include, without limitation, continuous monitoring by the topology engine of the management tools and topological components for changes in the network topology.

At block 525, network topology information may be transmitted to the client device, via the topology engine. In various embodiments, the network topology information may be transmitted to the client device as indicated by the request. When state tracking functionality is invoked at the topology engine, the topology engine may continue to monitor the various network devices for changes to the network topology. At decision block 530, the topology engine may determine whether a network topology has changed for at least one network service, as indicate din the request. In various embodiments, the topology engine may determine whether a change has occurred based on the continuous monitoring of state information from the one or more network devices. According to one set of embodiments, the topology engine may continuously monitor the one or more network devices through the various management tools and topological components available to the topology engine.

At block 535, if a change has occurred to the network topology, the network topology information is updated with the detected changes in the network topology. In various embodiments, the topology engine may update the previously generated network topology information with the changes reported by the state information. In other embodiments, the topology engine may generate updated network topology information from the updated state information.

At block 540, the client device may be synchronized with updates to the network topology information. According to various embodiments, the client device may be continuously in communication with the topology engine while state tracking functionality is invoked. Thus, at block 545, updates to the network topology information may automatically be sent to the client device by the topology engine. In one set of embodiments, updates to the network topology information may be transmitted as updated network topology information generated by the topology engine. In another set of embodiments, updates to the network topology information may be transmitted as changes from the previously generated network topology information to be implemented, by the client device, to the previously transmitted network topology information.

Figure 6:
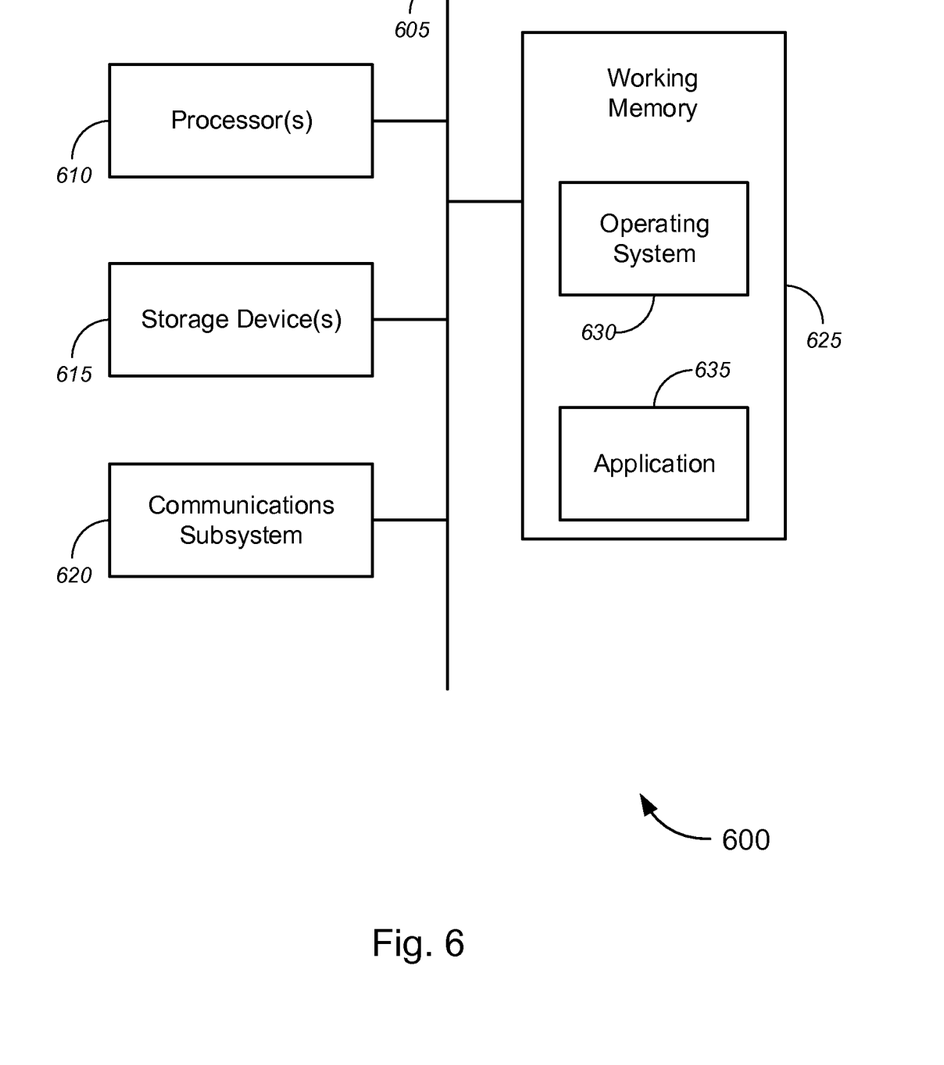
FIG. 6 is a block diagram of a computer architecture for topology engine state tracking, in accordance with various embodiments.

FIG. 6 is a block diagram of an exemplary computer architecture 600 that may be used for providing captive portal service offerings, in accordance with various embodiments. FIG. 6 provides a schematic illustration of one embodiment of a computer system 600 that can perform the methods provided by various other embodiments, as described herein, and/or can perform the functions of the one or more network devices, topology engine, or any other computer systems as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or integrated manner.

The computer system 600 includes a plurality of hardware elements that can be electrically coupled via a bus 605 (or may otherwise be in communication, as appropriate). The hardware elements may include one or more processors 610, including, without limitation, one or more general-purpose processors and/or one or more special-purpose processors (such as digital signal processing chips, graphics acceleration processors, and/or the like).

The computer system 600 may further include, or be in communication with, one or more storage devices 615. The one or more storage devices 615 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including, without limitation, various file systems, database structures, or the like.

The computer system 600 might also include a communications subsystem 620, which can include, without limitation, a modem, a network card (wireless or wired), a wireless programmable radio, or a wireless communication device. Wireless communication devices may further include, without limitation, a Bluetooth device, an 802.11 device, a WiFi device, a WiMax device, a WWAN device, cellular communication facilities, or the like. The communications subsystem 620 may permit data to be exchanged with a customer premises, residential gateway, integrated residential gateway, authentication server, walled garden, or combination of the above elements, as described above. Communications subsystem 620 may also permit data to be exchanged with other computer systems, and/or with any other devices described herein, or with any combination of network, systems, and devices. According to some embodiments, the network might include a local area network ("LAN"), including without limitation a fiber network, or an Ethernet network; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth protocol, or any other wireless protocol; or any combination of these or other networks.

In many embodiments, the computer system 600 will further comprise a working memory 625, which can include a RAM or ROM device, as described above. The computer system 600 also may comprise software elements, shown as being currently located within the working memory 625, including an operating system 530, device drivers, executable libraries, and/or other code. The software elements may include one or more application programs 635, which may comprise computer programs provided by various embodiments, and/or may be designed to implement methods and/or configure systems provided by other embodiments, as described herein.

By way of example, one or more procedures described with respect to the methods discussed herein might be implemented as code and/or instructions executable by a computer (and/or a processor within a computer). In an aspect, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 615 described above. In some cases, the storage medium 615 might be incorporated within a computer system 600. In other embodiments, the storage medium might be separate from the computer system 600, in the form of a removable medium, such as an optical disc, USB flash drive, or the like. In some embodiments, the storage medium might be provided in an installation package, such that the storage medium can be used to program, configure, and/or adapt a general purpose computer with the instructions/code stored thereon. These instructions might take the form of executable code, which is executable by the processor(s) 600 and/or might take the form of source and/or installable code. The source or installable code, upon compilation, installation, or both compilation and installation, on the computer system 600 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, and/or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system 600 to perform methods in accordance with various embodiments of the invention. According to a set of embodiments, some or all of the procedures of such methods are performed by the computer system 600 in response to processor 610 executing one or more sequences of one or more instructions. The one or more instructions might be incorporated into the operating system 630 and/or other code that may be contained in working memory 625, such as an application program 635. Such instructions may be read into the working memory 625 from another computer readable medium, such as one or more of the storage device(s) 615. Merely by way of example, execution of the sequences of instructions contained in the working memory 625 might cause the processor(s) 610 to perform one or more procedures of the methods described herein.

The terms "machine readable medium" and "computer readable medium," as used herein, refer to any medium that participates in providing data that causes a machine to operation in a specific fashion. In one set of embodiments, various computer readable media might be involved in providing instructions/code to processor(s) 610 for execution, might be used to store and/or carry such instructions/code such as signals, or both. In many implementations, a computer readable medium is a non-transitory, physical, and/or tangible storage medium. Such a medium may take many forms, including, but not limited to, non-volatile media, volatile media, and transmission media. Non-volatile media includes, for example, optical disks, magnetic disks, or both, such as the storage device(s) 615. Volatile media includes, without limitation, dynamic memory, such as the working memory 625. Transmission media includes, without limitation, coaxial cables, copper wire and fiber optics, including the wires that comprise the bus 505, as well as the various components of the communication subsystem 620, and/or the media by which the communications subsystem 620 provides communication with other devices. Hence, transmission media can also take the form of waves, including, without limitation, radio, acoustic, and/or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium; a RAM, a PROM, an EPROM, a FLASH-EPROM, or any other memory chip or cartridge; a carrier wave; or any other medium from which a computer can read instructions or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 620 (and/or components thereof) generally will receive the signals, and the bus 605 then might carry the signals (and/or the data, instructions, etc. carried by the signals) to the working memory 625, from which the processor(s) 610 retrieves and executes the instructions. The instructions received by the working memory 625 may optionally be stored on a storage device 615 either before or after execution by the processor(s) 610.

According to a set of embodiments, the computer system 600 may have access to, and be in communication with, one or more management tools and topological components to receive state information from one or more network devices. The computer system may also be in communication with one or more client devices requesting network topology information from the computer system 600. The computer system 600 may communicate via a wired connection utilizing Ethernet, broadband cable, or optical fiber, or a wireless connection utilizing any of a WiFi, 3G, 4G, or other wireless data connection.

The computer system 600 may then generate network topology information from the state information, as requested by a client device. The computer system 600 may then transmit the network topology information to the client device. In various embodiments, the computer system 600 may additionally have state tracking functionality invoked by the client device. The computer system 600 may continuously monitor the various network devices through the various management tools and topological components for changes to the network topology, as determined by changes in reported state information. The computer system 600 may be operable to, then, update the network topology information based on the detected changes to the network topology. The updated network topology information may then also be transmitted to the client device, substantially in real-time, as a part of the state tracking functionality.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for topology state tracking comprising:
   a client device configured to request network topology information;
   a topology engine coupled to one or more network device and in communication with the client device, the topology engine comprising:
   at least one processor;
   non-transitory computer readable media having encoded thereon computer software comprising a set of instructions executable by the at least one processor to perform one or more operations, the set of instructions comprising:
   instructions to receive, from each of the one or more network device, state information associated with at least one network service;
   instructions to generate, based on the state information, network topology information for the at least one network service, wherein the network topology information is indicative of a network topology in real-time, based on the state information;
   instructions to provide, via a state tracking application programming interface, access to the network topology information by the client device;
   instructions to receive, via the state tracking application programming interface, a request for network topology information from the client device;
   instructions to monitor, responsive to the request for network topology information, the one or more network device for changes in the state information of the one or more network devices associated with the at least one network service;
   instructions to determine, based on the state information, changes in the network topology for the at least one network service;
   instructions to update, in response to the changes in the network topology, the network topology information; and
   instructions to transmit, via the state tracking application programming interface, the network topology information to the client device; and
   wherein the client device generates a topology map from the network topology information, wherein the topology map visually represents a network topology and changes to the network topology in real-time.

2. The system of claim 1, wherein the set of instructions further comprises instructions to synchronize network topology information with the client device, wherein updates to the network topology information are automatically transmitted.

3. The system of claim 1, wherein changes to the network topology are visually indicated in real-time on the topology map.

4. The system of claim 1, wherein the network topology information corresponds to state information for one or more layers of the at least one network service.

5. The system of claim 4, wherein the topology map depicts a network topology at the one or more layers of the at least one network service.

6. The system of claim 4, wherein the client device is configured to generate a topology map for a single layer of the one or more layers.

7. The system of claim 4, wherein the request for network topology information specifies a layer of the one or more layers, and wherein the topology engine transmits network topology information corresponding to the layer of the one or more layers indicated in the request.

8. The system of claim 7, wherein the topology map depicts a network topology at the layer indicated for the at least one network service.

9. The system of claim 7, wherein the request for network topology information further specifies a network service of the at least one network service, and wherein the topology engine transmits network topology information corresponding to the specified network service of the at least one network service as indicated in the request.

10. A topology engine for topology state tracking comprising:
   at least one processor;
   non-transitory computer readable media having encoded thereon computer software comprising a set of instructions executable by the at least one processor to perform one or more operations, the set of instructions comprising:
      instructions to receive, from each of the one or more network device, state information associated with at least one network service;
      instructions to generate, based on the state information, network topology information for the at least one network service, wherein the network topology information is indicative of a network topology in real-time, based on the state information;
      instructions to provide, via a state tracking application programming interface, access to the network topology information by a client device;
      instructions to receive, via the state tracking application programming interface, a request for network topology information from the client device;
      instructions to monitor, responsive to the request for network topology information, the one or more network device for changes in the state information of the one or more network devices associated with the at least one network service;
      instructions to determine, based on the state information, changes in the network topology for the at least one network service;
      instructions to update, in response to the changes in the network topology, the network topology information; and
      instructions to transmit, via the state tracking application programming interface, the network topology information to the client device.

11. The topology engine of claim 10, the set of instructions further comprises instructions to poll each of the one or more network devices for their respective state information.

12. The topology engine of claim 10, wherein the set of instructions further comprises instructions to synchronize network topology information with the client device, wherein updates to the network topology information are automatically transmitted.

13. The topology engine of claim 10, wherein the network topology information corresponds to state information for one or more layers of the at least one network service.

14. The topology engine of claim 13, wherein the request for network topology information specifies a layer of the one or more layers, and wherein the topology engine transmits network topology information corresponding to the layer of the one or more layers indicated in the request.

15. The topology engine of claim 14, wherein the request for network topology information further specifies a network service of the at least one network service, and wherein the topology engine transmits network topology information corresponding to the specified network service of the at least one network service as indicated in the request.

16. A method for topology engine state tracking comprising:
   providing, via a topology engine, access to network topology information by a client device;
   receiving, via the topology engine, state information associated with one or more network devices and at least one network service;
   generating, via the topology engine, the network topology information for the at least one network service, wherein the network topology information is indicative of a network topology based on the state information;
   receiving, via the topology engine, a request for the network topology information from the client device;
   transmitting, via the topology engine, the network topology information to the client device;
   monitoring, via the topology engine, the one or more network device for changes in the state information of the one or more network devices associated with the at least one network service, responsive to the request;
   determining, via the topology engine, changes in the network topology for the at least one network service based on the state information; and
   updating, via the topology engine, the network topology information with changes in the network topology.

17. The method of claim 16 further comprising:
   synchronizing, via the topology engine, the client device with updates to the network topology information; and
   transmitting, via the topology engine, updates to the network topology information automatically to the client device.

18. The method of claim 16, wherein the network topology information corresponds to state information for one or more layers of the at least one network service.

19. The method of claim 18, wherein the request for network topology information specifies a layer of the one or more layers, and wherein the topology engine transmits network topology information corresponding to the layer of the one or more layers indicated in the request.

20. The method of claim 19, wherein the request for network topology information further specifies a network service of the at least one network service, and wherein the topology engine transmits network topology information corresponding to the specified network service of the at least one network service as indicated in the request.

* * * * *

UNITED STATES PATENT AND TRADEMARK OFFICE
CERTIFICATE OF CORRECTION

PATENT NO. : 10,153,946 B2  
APPLICATION NO. : 14/682360  
DATED : December 11, 2018  
INVENTOR(S) : John T. Pugaczewski Page 1 of 1

It is certified that error appears in the above-identified patent and that said Letters Patent is hereby corrected as shown below:

In the Specification

Column 1, Line 8:
Delete: "filed on Apr. 15, 2014 by Steven M. Casey, et al., entitled"
Insert: --filed on Apr. 15, 2014 by John T. Pugaczewski, entitled--

Signed and Sealed this
Seventh Day of May, 2019

Andrei Iancu
*Director of the United States Patent and Trademark Office*